Figure 1:
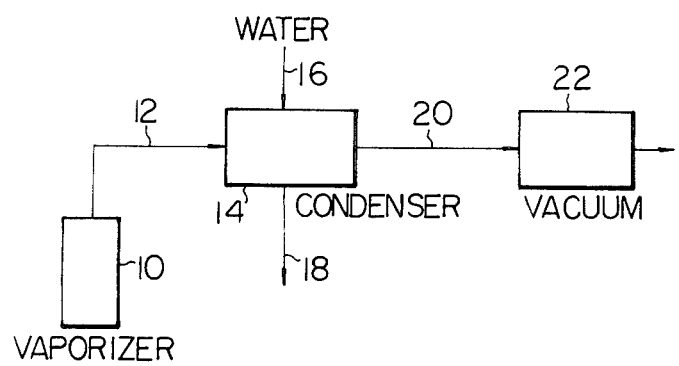

United States Patent [19]

Fujikawa et al.

[11] 4,106,918

[45] Aug. 15, 1978

[54] METHOD OF RECOVERING FLUORINE FROM VAPOR OF CRUDE PHOSPHORIC ACID SOLUTION

[75] Inventors: Tomio Fujikawa; Masayasu Funakoshi; Tadanori Misumi, all of Ube, Japan

[73] Assignee: Central Glass Company, Limited, Ube, Japan

[21] Appl. No.: 665,706

[22] Filed: Mar. 11, 1976

[30] Foreign Application Priority Data

Mar. 14, 1975 [JP] Japan .................. 50-30236

[51] Int. Cl.² ............................................ B01D 5/00
[52] U.S. Cl. .................... 55/71; 202/185 A
[58] Field of Search ........... 55/71, 93, 94, 223; 423/240, 321, 321 R, 500, 488; 202/186, 185 A; 203/42, 87, 23

[56] References Cited

U.S. PATENT DOCUMENTS

| | | | |
|---|---|---|---|
| 2,929,690 | 3/1960 | Bennett et al. | 55/71 |
| 2,933,372 | 4/1960 | Manning | 423/321 R |
| 3,256,062 | 6/1966 | Wylegala | 423/240 X |
| 3,476,775 | 11/1969 | Sueur | 203/87 |
| 3,534,562 | 10/1970 | Thijssen | 203/87 |
| 3,615,195 | 10/1971 | Bierman, Jr. | 423/488 |
| 3,713,786 | 1/1973 | Umstead | 203/87 |
| 3,811,246 | 5/1974 | Erickson | 55/71 |
| 3,852,050 | 12/1974 | Hsiao et al. | 55/94 X |
| 4,011,301 | 3/1977 | Young | 55/71 |

FOREIGN PATENT DOCUMENTS 1,258,844 1/1968 Fed. Rep. of Germany.
6,715,130 5/1969 Netherlands.

*Primary Examiner*—Charles N. Hart
*Assistant Examiner*—E. Rollins Cross
*Attorney, Agent, or Firm*—Fleit & Jacobson

[57] ABSTRACT

To remove fluorides from a vapor generated by evaporation under reduced pressure of an aqueous solution of crude phosphoric acid containing fluorides, the vapor is at first brought into direct contact with cooling water to accomplish a partial condensation of the vapor and transfer the fluorides almost entirely to the condensate, and the noncondensed portion of the vapor is brought into direct contact with a separate cooling water. The mixture of the condensate and cooling water resulting from the partial condensation step is cooled by indirect heat exchange with a cooling fluid and partly recycled as cooling water to the partial condensation step.

6 Claims, 3 Drawing Figures

METHOD OF RECOVERING FLUORINE FROM VAPOR OF CRUDE PHOSPHORIC ACID SOLUTION

This invention relates to a method of recovering fluorine compounds contained in a vapor generated by vacuum evaporation of a crude phosphoric acid solution for either concentration or cooling of the solution.

In industrial preparation of phosphoric acid by the wet process, it is of great importance and significant concern to remove fluorine and its compounds from waste gas and waste water of the process before discharge of the gas and water out of the plant. Failure in this matter will sometimes be fatal to phosphoric acid plants in view of current trends of preventing pollution of air and water and regulations against any contamination with fluorine.

An aqueous solution of crude phosphoric acid is prepared in usual wet processes by the decomposition of phosphor rock with sulfuric acid. Due to the presence of fluorine and silica in phosphor rock (a major component of phosphor rock may be expressed by $Ca_5F(PO_4)_3$), gases of fluorine compounds are generated during the decomposition of phosphor rock through the following reactions:

$$Ca_5F(PO_4)_3 + 5H_2SO_4 + xH_2O = 5CaSO_4 \cdot (x/5)H_2O + 3H_3PO_4 + HF \quad (1)$$

$$4HF + SiO_2 \rightarrow SiF_4 + 2H_2O \quad (2)$$

$$3SiF_4 + 2H_2O \rightarrow 2H_2SiF_6 + SiO_2 \quad (3)$$

$$H_2SiF_6 \rightarrow SiF_4 + 2HF \quad (4)$$

As seen from these chemical equations, HF gas is generated upon treatment of phosphor rock with sulfuric acid and reacts with $SiO_2$ contained in phosphor rock to form $SiF_4$. A minor portion of the thus formed $SiF_4$ will evaporate and dissipate into air, but a major portion reacts with water and turns into $H_2SiF_6$ which remains in the phosphoric acid solution. Therefore, a great majority of fluorine contained in the crude phosphoric acid solution is considered to be in the form of $H_2SiF_6$. When the phosphoric acid solution is subjected to evaporation under reduced pressure, $H_2SiF_6$ in the solution decomposes according to the equation (4), so that the vapor (mostly steam) generated by the evaporation of the acid solution contains silicon tetrafluoride gas and hydrogen fluoride gas.

It is usually necessary to partly vaporize under reduced pressure the phosphoric acid solution obtained by the sulfuric acid treatment for extracting the reaction heats. A similar evaporation is carried out also for concentrating the phosphoric acid solution. To maintain a chamber for accomplishing the evaporation at a reduced pressure, the generated vapor is passed to a condenser, and the noncondensed gas alone is sucked off by means of a vacuum device such as a vacuum pump or an ejector.

Figure 2:
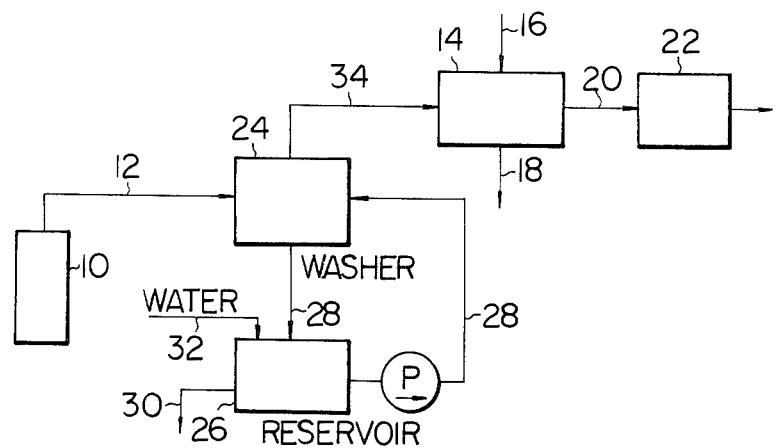
Figure 3:
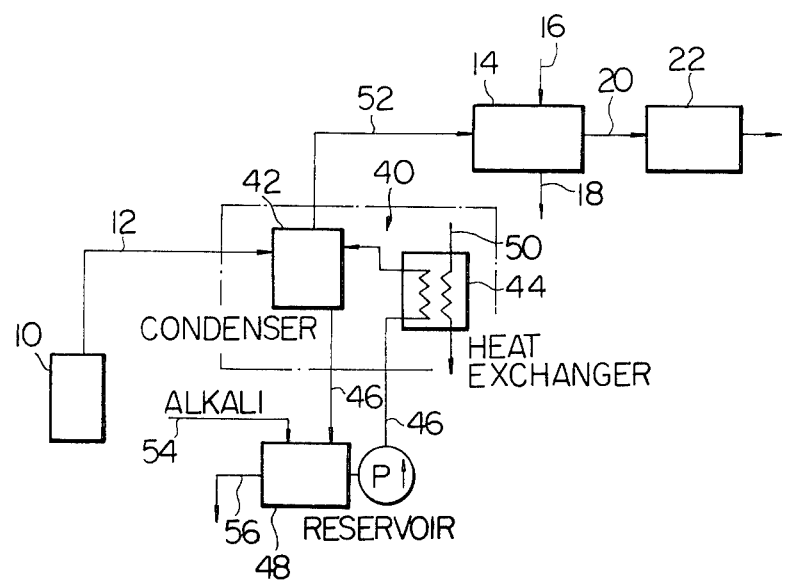

Two typical examples of conventional methods of treating a vapor generated by evaporation of a crude phosphoric acid solution will hereinafter be outlined with reference to part of the accompanying drawings, wherein:

FIGS. 1 and 2 are flow diagrams of two different conventional methods of treating a vapor containing fluorine compounds for recovery of the fluorine compounds; and FIG. 3 is a flow diagram of a method for the same purpose according to the invention.

In a method according to FIG. 1, a crude phosphoric acid solution is partly evaporated in a vacuum vaporizer 10, and the generated vapor which contains fluorine compounds (there compounds will hereinafter be referred to simply as fluorine) is passed through line 12 to a contact condenser 14. Cooling water is supplied to the condenser 14 through line 16, so that the vapor and cooling water come into direct contact with each other and are mixed in the condenser 14. Most of the vapor is condensed and discharged together with the cooling water from the condenser 14 through line 18. As a result, fluorine in the vapor is almost entirely transferred to the mixture of the condensate and cooling water. The noncondensed gas is withdrawn from the condenser 14 through line 20 by means of a vacuum device 22. This method has a disadvantage that large-scale facilities and great cost are needed for recovering fluorine from a large quantity of water discharged from the condenser 14.

As an improvement in the method of FIG. 1, a method according to FIG. 2 employs a washing tower 24 which is interposed between the vaporizer 10 and the condenser 14. The vapor is at first introduced into the washing tower 24 through the line 12 and washed with water which is recycled through line 28 from a receiving tank 26 to the washing tower 24. A portion of the washing water is drained from the receiving tank 26 through line 30 and fresh water is supplied to the receiving tank 26 through line 32. The washed vapor is passed through line 34 to the condenser 14 and condensed in the same manner as in the case of FIG. 1. Most of fluorine contained in the vapor can be removed from the vapor in the washing tower 24, but about 5 to about 10% of the entire fluorine remains in the washed vapor and is transferred to the cooling water in the condenser 14. Accordingly, not only the washing water drained from the tank 26 but also the mixture of the condensate and cooling water discharged from the condenser 14 must be subjected to fluorine recovery processes. The washing tower 24 is effective in removing a major portion of fluorine from the vapor, but a major portion of the vapor remains noncondensed in the washing tower 24 and is passed to the condenser 14. Accordingly, a large quantity of cooling water is yet needed for accomplishing condensation of steam in the condensor 14 and has to be treated afterwards for recovery of fluorine.

It is a recent trend to require by regulations that chemical plants emit as little waste water as possible even though the waste water is purified in advance. The cooling water for the condenser 14, therefore, is cooled and reused in many plants. In such a case, the recovery of fluorine from the cooling water should be done thoroughly so that a water cooling tower may not be damaged by fluorine. The provision of the washing tower 24 between the vaporizer 10 and the condenser 14 cannot allow the mixture of the condensate and cooling water discharged from the condenser 14 to be directly passed to a cooling tower with no treatment for recovery of fluorine.

If the vapor generated in the vaporizer 10 is condensed by means of a surface condenser to prevent fluorine in the vapor from being transferred to the cooling water, there arises a problem that $SiO_2$ deposits on the heat-transfer surfaces of the condenser due to the reaction between the condensed water and silicon tetrafluoride as expressed by the equation (3). The accumulation of the deposit as a scale leads to a lowering in the heat-transferring efficiency of the surface condenser. The surface condenser, therefore, needs to have an ample margin of its capacity and be cleaned frequently. Thus, none of known methods has succeeded in accomplishing the removal and recovery of fluorine contained in the vapor as hereinbefore described efficiently and economically.

It is an object of the present invention to provide an improved method of recovering fluorine compounds contained in a vapor which is generated by partial evaporation under reduced pressure of a crude phosphoric acid solution, which method does not require an unduly large condenser and causes the fluorine compounds to be transferred practically entirely to a relatively small quantity of water in high concentrations.

According to a method of the invention, a vapor generated by evaporation under reduced pressure of an aqueous solution of crude phosphoric acid containing fluorine compounds is at first brought into direct contact with cooling water in such a manner that from about 20 to about 90% of the vapor is liquefied, and the noncondensed portion of the vapor is brought into direct contact with cooling water, which is separate from the cooling water for the initial condensation step, to complete the condensation of the vapor. The mixture of the condensate and cooling water at the initial condensation step is cooled by heat exchange with a cooling fluid in fluidic isolation from the mixture, and a portion of the cooled mixture is recycled as the cooling water for the initial condensation step.

As a result, fluorides contained in the vapor can be transferred practically entirely to the aforementioned mixture at the initial condensation step, and the final condensation step can be accomplished by the use of a reduced quantity of water with little discharge of fluorine compounds.

The features and advantages of the invention will become apparent from the following detailed description of a preferred embodiment with reference to FIG. 3 of the accompanying drawing.

As shown in FIG. 3, apparatus for practicing a method according to the invention includes a combination indicated at 40 of an auxiliary or partial condenser 42 and a heat exchanger 44, which does not allow two fluids subjected to heat exchange to come into contact with each other. The partial condenser 42 is of a vapor-liquid contact type such as e.g., a tray column type or a spray type. The heat exchanger 44 can be selected optionally among various types and may be, e.g., of a shell-and-tube type or a plate type. The partial condenser 42 and the heat exchanger 44 are connected to each other by line 46 such that the mixture of the cooling water and the condensate is introduced into a receiving tank 48, then cooled in the heat exchanger 44 by an indirect heat exchange with a cooling liquid which is recycled through line 50 and thereafter introduced into the partial condenser 42. The line 12 connects the vacuum vaporizer 10 to the partial condenser 42 to pass therethrough the fluorine-containing vapor. The gas outlet of the partial condenser 42 is connected to the main condenser 14 through line 52. The cooling water lines 16 and 18, the gas line 20 and the vacuum device 22 are arranged in the same manner as in conventional methods exemplified by FIG. 2.

According to the invention, the fluorine-containing vapor and the recycled cooling water are supplied to the partial condenser 42 respectively at such rates that at least 20%, and preferably from 50% to 90%, of the vapor generated in the vaporizer 10 is condensed upon contact with the cooling water in the partial condenser 42. When such a portion of the vapor is condensed, practically entire fluorine is transferred to the mixture of the condensate and cooling water. A complete transfer of fluorine to water can of course be realized if the vapor is entirely condensed at a single stage in the condenser 42. However, the heat exchanger 44 must be of a great capacity in such a case. From the viewpoint of total equipment investment, it is more profitable to condense the vapor by a two-state process as in a method of the invention.

The noncondensed portion of the vapor contains only trace amount of fluorine and is passed to the main condenser 14 through the line 52. The vapor is made to come into direct contact with the cooling water supplied through the line 16 to the main condenser 14. Since a considerable portion of the vapor was condensed in the partial condenser 42, the quantity of the cooling water for the main condenser 14 is considerably smaller than a quantity needed in conventional methods. The mixture of the condensate and cooling water discharged from the main condenser 14 may be emitted from the apparatus even with no treatment for recovery of fluorine because of an extremely low (close to zero) fluorine concentration therein and a comparatively small quantity thereof. Of course, this mixture may be cooled in a cooling tower (not shown) and reused. The noncondensed gas is withdrawn from the condenser 14 through the line 20 and sucked into the vacuum device 22.

The mixture of the receiving tank 48 contains fluorine in a high concentration and has a relatively small pH value. It is permissible to recycle this mixture to the condenser 42 with no treatment other than cooling in the heat exchanger 44. It is preferable, however, to adjust the pH of this mixture to from about 7 to about 9 by the addition of an alkaline substance such as, e.g., sodium hydroxide or ammonia through line 54 to the mixture in the receiving tank 48. Such pH adjustment is effective in protecting the condenser 42 and heat exchanger 44 against corrosion and gives rise to a saving in the expense of apparatus and labor for maintenance of apparatus. A portion of the recycle water is drained from the receiving tank 48 through line 56 when the vapor is continuously condensed in the condenser 42. The recovery of fluorine from the drained water can be accomplished by any known method. For example, fluorine can be deposited and recovered as calcium fluoride by adding calcium in the form of lime, slaked lime, lime milk or calcium chloride to the drained water. After separation by filtration of the deposited calcium fluoride, the filtrate may be either wasted or reused as cooling water.

Remarkable advantages of a method according to the invention will be recognized more practically from the following examples.

EXAMPLE 1

A phosphoric acid solution containing fluorides was subjected to evaporation under reduced pressure in the vaporizer 10 to generate a vapor (mostly steam) at a rate of 1.973 tons/hr. The vapor was made to contact with a 37° C cooling water which was supplied to the partial condenser 42 at a rate of 31 tons/hr. The temperature of a resulting mixture of the cooling water and the condensate was 64° C when the mixture was introduced into the receiving tank 48. This mixture was cooled to 37° C by means of the heat exchanger 44 of the indirect type and recycled as the cooling water to the partial condenser 42. A portion of the recycled water was drained from the receiving tank 48 (i.e., out of the vapor treatment apparatus) at a rate of 1.6 tons/hr, and the drained water was found to contain fluorine in a concentration of 1976 ppm. The noncondensed vapor was passed from the partial condenser 42 to the main condenser 14 at a rate of 0.433 tons/hr. The concentration of fluorine in the noncondensed vapor was 3.71 ppm by volume on the basis of F at the entrance to the condenser 14. A 27° C cooling water was supplied to the condenser 14 at a rate of 42 tons/hr. The temperature of water discharged from the condenser 14 was 33° C, and the concentration of fluorine was 0.04 ppm or below. The condensed and recycled water for the partial condenser 42 was fed with a 48% aqueous solution of sodium hydroxide at a rate of 57 kg/hr to maintain the pH of the recycled water at from about 8 to about 9.

Fluorine was removed from the starting vapor at first in the partial condenser 42 at a rate of 3.162 kg/hr and then in the main condenser 14 at 0.0017 kg/hr, so that practically complete removal of fluorine from the vapor was accomplished in the partial condenser 42. If the heat exchanger 44 is omitted and, instead, a 27° C water is supplied to the condensed water in the receiving tank 48 to maintain the water temperature at the entrance to the partial condenser 42 at 37° C, the mixture of the condensate and cooling water passed from the partial condenser 42 must be discharged out of the recovery apparatus in a quantity per unit time 15 times as large as the quantity of the drained water when the heat exchanger 44 is used. The omission of the heat exchanger 44 is disadvantageous because of a great increase in the quantity of water which needs to be subjected to a defluorination treatment and necessity for increasing the capacities of the partial condenser 42 and the receiving tank 48.

EXAMPLE 2

This example was carried out generally according to the process of Example 1.

The fluorides-containing vapor was supplied from the vaporizer 10 to the partial condenser 42 at a rate of 1.794 tons/hr. The recycled water was introduced into the partial condenser 42 at 35° C and at a rate of 26 tons/hr, and the water temperature in the receiving tank 48 was 63° C. The recycled water was drained from the receiving tank 48 at a rate of 1.44 tons/hr and the concentration of fluorine in the drained water was 11950 ppm. The noncondensed portion of the vapor which contained fluorine in a concentration of 3.18 ppm was passed to the main condenser 14 at a rate of 0.483 tons/hr. A 27° C cooling water was supplied to the condenser 14 at a rate of 40 tons/hr and discharged therefrom at 34° C and in a fluorine concentration of 0.04 ppm or below.

To examine the influence of the fluorine concentration in the recycled water on the recovery of fluorides in the partial condenser 42, sodium siliconfluoride (at a rate of 24 kg/hr) and a 48% aqueous solution of sodium hydroxide (at a rate of 102 kg/hr) were added to the recycled water, so that the pH of the recycled water was maintained at 9 ± 0.5. Fluorine was delivered from the vaporizer 10 at a rate of 2.657 kg/hr (contained in the vapor) and removed from the vapor in the partial condenser 42 at a rate of 2.655 kg/hr. This means a practically complete capture of fluorine in the partial condenser 42 despite a greatly enriched fluorine concentration of the recycled cooling water for the partial condensation.

When the heat exchanger 44 was omitted by adding a large quantity of cold water to the recycled water, it was necessary to drain water from the receiving tank 48 at a rate of 21.66 tons/hr, which was about 15 times as large as the aforementioned value, 1.44 tons/hr.

What is claimed is:

1. A method of recovering fluorine values from the vapor generated by evaporation under reduced pressure of an aqueous solution of crude phosphoric acid prepared by the wet process, said vapor consisting of a condensable portion comprising the fluorine values and a noncondensable portion, comprising:
   (a) directly contacting the vapor with a first cooling water to condense into a liquid from about 50 to 90% of the condensable portion containing essentially all of the fluorine values;
   (b) separating the resulting mixture of condensate and first cooling water from the noncondensed portion of the vapor;
   (c) directly contacting the noncondensed portion of the vapor, which contains only trace amounts of the fluorine values, with a second cooling water to condense into a liquid the rest of the condensable portion containing the remainder of the fluorine values;
   (d) separating the resulting mixture of condensate and second cooling water from the remaining noncondensed portion of the vapor which consists essentially of noncondensable gases;
   (e) cooling the mixture of condensate and first cooling liquid from step (b) by heat exchange with a cooling fluid in fluidic isolation from said mixture;
   (f) recycling a portion of the cooled mixture from step (e) to step (a) to serve as first cooling water, while maintaining said mixture isolated from said second cooling water, so that all of said first cooling water is provided by steps (a) and (f);
   (g) recovering the fluorine values from the remainder of the cooled mixture of step (f); and
   (h) adjusting the pH of the cooled mixture of condensate and first cooling liquid from step (e) to about from 7 to 9.

2. The method of claim 1 wherein the pH is adjusted by means of sodium hydroxide.

3. The method of claim 1 comprising the additional step (h) of cooling the mixture of condensate and second cooling water and recycling it to step (c) to serve as second cooling water thereby permitting the entire method to be conducted in a closed liquid system.

4. The method of claim 1 wherein the first cooling water is at a temperature of about from 35° C to 37° C when it contacts the vapor in step (a).

5. The method of claim 1 wherein the mixture of condensate and first cooling water is cooled to about 37° C by the heat exchange in step (e).

6. The method of claim 1 wherein the second cooling water is at a temperature of about 27° C when it contacts the vapor in step (c).

* * * * *